(12) United States Patent
Liu et al.

(10) Patent No.: US 12,325,804 B2
(45) Date of Patent: Jun. 10, 2025

(54) FOAMING MATERIAL, AND THERMAL INSULATION CABINET AND METHOD FOR PREPARING SAME

(71) Applicants: QINGDAO HAIER REFRIGERATOR CO., LTD., Qingdao (CN); HAIER SMART HOME CO., LTD., Qingdao (CN)

(72) Inventors: Zhanzhan Liu, Qingdao (CN); Peng Li, Qingdao (CN); Kunkun Zhao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 435 days.

(21) Appl. No.: 17/916,555

(22) PCT Filed: Feb. 1, 2021

(86) PCT No.: PCT/CN2021/074601
§ 371 (c)(1),
(2) Date: Sep. 30, 2022

(87) PCT Pub. No.: WO2021/196862
PCT Pub. Date: Oct. 7, 2021

(65) Prior Publication Data
US 2023/0151243 A1   May 18, 2023

(30) Foreign Application Priority Data
Mar. 30, 2020 (CN) .......................... 202010236074.0

(51) Int. Cl.
| | | |
|---|---|---|
| *C08G 18/40* | (2006.01) | |
| *B29C 44/12* | (2006.01) | |
| *B29C 44/14* | (2006.01) | |
| *B29C 44/18* | (2006.01) | |
| *B29C 44/34* | (2006.01) | |
| *C08G 18/42* | (2006.01) | |
| *C08G 18/48* | (2006.01) | |
| *C08J 9/14* | (2006.01) | |
| *C09D 5/02* | (2006.01) | |
| *C09D 175/08* | (2006.01) | |
| *F25D 23/06* | (2006.01) | |
| *B29K 75/00* | (2006.01) | |
| *B29L 31/00* | (2006.01) | |

(52) U.S. Cl.
CPC ........ *C09D 175/08* (2013.01); *B29C 44/1228* (2013.01); *B29C 44/14* (2013.01); *B29C 44/18* (2013.01); *B29C 44/3415* (2013.01); *C08G 18/4018* (2013.01); *C08G 18/4219* (2013.01); *C08G 18/4829* (2013.01); *C08J 9/141* (2013.01); *C09D 5/021* (2013.01); *F25D 23/065* (2013.01); *B29K 2075/00* (2013.01); *B29K 2995/0015* (2013.01); *B29K 2995/0063* (2013.01); *B29K 2995/0077* (2013.01); *B29L 2031/7622* (2013.01); *C08G 2150/60* (2013.01); *C08J 2201/022* (2013.01); *C08J 2203/14* (2013.01); *C08J 2375/08* (2013.01); *F25D 2201/122* (2013.01)

(58) Field of Classification Search
CPC ............ C08G 18/4018; C08G 18/4219; C08G 18/4829; C08J 9/141; C08J 2203/14; C08J 2375/08; B29C 44/1228; B29C 44/18; B29C 44/3415
See application file for complete search history.

(56) References Cited

U.S. PATENT DOCUMENTS

| | | | | |
|---|---|---|---|---|
| 2002/0052425 | A1* | 5/2002 | Kaku ................. | C08G 18/4072 521/137 |
| 2018/0346636 | A1* | 12/2018 | Koch ................. | C08G 18/1825 |
| 2022/0162372 | A1* | 5/2022 | Wagner ............. | C08G 18/7664 |

FOREIGN PATENT DOCUMENTS

| | | |
|---|---|---|
| CN | 1421473 A | 6/2003 |
| CN | 105085970 A | 11/2015 |
| CN | 107245137 A | 10/2017 |
| CN | 108129631 A | 6/2018 |
| CN | 108192065 A | 6/2018 |
| CN | 108276546 A | 7/2018 |
| CN | 109206574 A | 1/2019 |
| CN | 109503794 A | 3/2019 |
| CN | 109968580 A | 7/2019 |
| WO | 2016/150016 A1 | 9/2016 |
| WO | 2018/093709 A1 | 5/2018 |

OTHER PUBLICATIONS

Mechanical translation of CN 108129631 A dated Jun. 8, 2018. (Year: 2018).*
Mechanical translation of CN 108192065 A dated Jun. 22, 2018. (Year: 2018).*

* cited by examiner

*Primary Examiner* — Robert B Davis
(74) *Attorney, Agent, or Firm* — Cheng-Ju Chiang

(57) ABSTRACT

Disclosed are a foaming material, a thermal insulation cabinet, and preparation methods therefor. The foaming material comprises 100 parts of a combined polyol, 10-30 parts of a foaming agent composition, and 120-150 parts of an isocyanate. In the present invention, the type of the polyol used in a foaming system is adjusted in order to increase the content of a polyester polyol and reduce the content of a polyether polyol, such that the compressive strength of the foaming material is significantly improved without increasing or changing the injection amount.

15 Claims, No Drawings

FOAMING MATERIAL, AND THERMAL INSULATION CABINET AND METHOD FOR PREPARING SAME

CROSS REFERENCE TO RELATED APPLICATIONS

This application is a 35 U.S.C. § 371 National Phase conversion of International (PCT) Patent Application No. PCT/CN2021/074601, filed on Feb. 1, 2021, which claims priority to Chinese Patent Application No. 202010236074.0, filed on Mar. 30, 2020, the disclosure of which is here incorporated by reference in its entirety. The PCT International Patent Application was filed and published in Chinese.

TECHNICAL FIELD

The present invention relates to the field of foaming technologies, and particularly relates to a foaming material with high compression strength, a method for preparing a thermal insulation cabinet using the foaming material, and a thermal insulation cabinet prepared by the method.

BACKGROUND

Currently, a large volume is one of the users' requirements for a refrigerator, so the pursuit of a larger volume ratio has become one of the main directions of refrigerator research and development. Under the condition of the same external dimensions, an effective means to increase the volume in most cases is to thin a thermal insulation layer and replace a foaming material with a vacuum insulation panel having a better thermal insulation effect, so as to strike a balance between the larger volume and energy saving.

After the thermal insulation layer of a cabinet is thinned, the overall strength of the cabinet is weakened and the deformation size of the cabinet is increased. However, a traditional solution is to overfill a foaming material, including increasing the foaming density and the foaming compression strength, so as to improve the strength of the cabinet. However, injecting a large amount of the foaming material leads to a large increase in cost, demands more on the pressure and the performance of a foaming fixture and results in a shorter service life of the fixture. In addition, too much material injection likely leads to more overflow of the cabinet.

In view of this, it is necessary to provide a foaming material, a thermal insulation cabinet and a method for preparing the same, so as to solve the above problems.

SUMMARY

The present invention aims to solve at least one of the technical problems in the prior art, thereby providing a foaming material with high compression strength, a method for preparing a thermal insulation cabinet using the foaming material, and a thermal insulation cabinet prepared by the method.

To fulfill one of the objectives of the present invention, the technical solutions of the present invention are described as below.

A foaming material, comprising (in parts by mass):
100 parts of combined polyols,
10-30 parts of a foaming agent composition; and
120-150 parts of isocyanate,
wherein the combined polyols comprise:
10 parts of polyether polyol A prepared by enabling mannitol as an initiator to react with olefin oxide;
5-15 parts of polyether polyol B prepared by enabling pentaerythritol as an initiator to react with olefin oxide;
5-25 parts of polyether polyol C prepared by enabling sucrose and glycerol as initiators to react with olefin oxide; and
50-75 parts of polyester polyol prepared by synthesizing one of phthalic acid, adipic acid and phthalic anhydride with polyol, wherein polyol is ethylene glycol, propylene glycol or pentaerythritol.

Further, wherein the combined polyols have a viscosity of 1,500 mpa·s to 3,000 mpa·s and a hydroxyl value of 350 mg KOH/g to 500 mg KOH/g at a room temperature; and/or
the blowing agent composition comprises at least one of cyclopentane, isopentane, pentafluoropropene, 1-chloro-3,3,3-trifluoropropene and (Z)-1,1,1,4,4,4-hexafluoro-2-butene (LBA\FEA1100); and/or
isocyanate has a viscosity of 150 mpa·s to 250 mpa·s at the room temperature and contains 30.5% to 32% of an —NCO group.

To achieve the above-mentioned purpose of the invention, the invention also uses the following scheme:

A method for preparing a thermal insulation cabinet, comprising:
pre-assembling a shell into a cabinet shell; and
injecting the foaming material as defined in claim 1 or 2 between the cabinet shell and an inner liner for foaming,
wherein a foaming process comprises:
acquiring a first mixture by mixing combined polyols at a predetermined ratio;
acquiring a foaming agent mixture by pre-mixing foaming agents at a predetermined ratio;
acquiring a second mixture by mixing the foaming agent mixture with the first mixture at a predetermined ratio; and
mixing isocyanate with the second mixture at a predetermined ratio to form a new mixture, and injecting the new mixture between the cabinet shell and the inner liner for foaming.

Further, wherein:
stirring the combined polyols at a temperature of 20° C. to 25° C. for 2-3 hours; and/or
stirring the foaming agent mixture and the first mixture at a temperature of 20° C. to 25° C. and a pressure of 2-3 bars for 2-3 hours; and/or
mixing isocyanate with the second mixture at a temperature of 20° C. to 25° C. and a pressure of 120-30 bars.

Further, further comprising:
attaching a vacuum insulation panel to an inner side of the shell; and
heating an inside of the cabinet shell before foaming.

Further, wherein the inside of the cabinet shell is heated by blowing hot air to the inside at a foaming material injection hole of the cabinet shell.

Further, wherein the hot air is blown to the inside at the foaming material injection hole by a hot air gun.

Further, wherein
a temperature of the hot air ranges from 50° C. to 70° C.; and/or
the hot air is blown for 5 seconds to 10 seconds.

Further, wherein the inside of the cabinet shell is heated before or after the cabinet shell enters a foaming mould.

Further, further comprising: preheating the cabinet shell before heating the inside of the cabinet shell; or preheating the cabinet shell, putting the preheated cabinet shell into a foaming mould, and heating the inside of the cabinet shell.

To achieve the above-mentioned purpose of the invention, the invention also uses the following scheme:

A thermal insulation cabinet prepared by a method for preparing a thermal insulation cabinet, wherein the method for preparing a thermal insulation cabinet comprises:

pre-assembling a shell into a cabinet shell; and injecting the foaming material as defined in claim 1 between the cabinet shell and an inner liner for foaming, wherein a foaming process comprises:

acquiring a first mixture by mixing combined polyols at a predetermined ratio;

acquiring a foaming agent mixture by pre-mixing foaming agents at a predetermined ratio;

acquiring a second mixture by mixing the foaming agent mixture with the first mixture at a predetermined ratio; and mixing isocyanate with the second mixture at a predetermined ratio to form a new mixture, and injecting the new mixture between the cabinet shell and the inner liner for foaming.

Further, wherein:

the combined polyols are stirred for 2-3 hours at a temperature of 20° C. to 25° C.; and/or the foaming agent mixture and the first mixture are stirred at a temperature of 20° C. to 25° C. and a pressure of 2-3 bars for 2-3 hours; and/or isocyanate is mixed with the second mixture at a temperature of 20° C. to 25° C. and a pressure of 120-30 bars.

Further, wherein the method for preparing the thermal insulation cabinet further comprises:

attaching a vacuum insulation panel to an inner side of the shell; and heating an inside of the cabinet shell before foaming.

Further wherein the hot air is blown to the inside at the foaming material injection hole by a hot air gun; a temperature of the hot air ranges from 50° C. to 70° C.; and/or the hot air is blown for 5 seconds to 10 seconds.

Further, wherein the method for preparing the thermal insulation cabinet further comprises: preheating the cabinet shell before heating the inside of the cabinet shell; or preheating the cabinet shell, putting the preheated cabinet shell into a foaming mould, and heating the inside of the cabinet shell.

The present invention has the following beneficial effects: the types of the polyols used in the foaming system are adjusted, the content of the polyester polyol is increased, and the content of the polyether polyols is reduced, such that the compression strength of the foaming material is significantly improved without increasing or changing the material injection amount.

DETAILED DESCRIPTION

The technical solutions in the embodiments of the present invention will be clearly and completely described below with reference to the accompanying drawings in the embodiments of the present invention. Obviously, the embodiments described are merely some but not all embodiments of the present invention. Based on the embodiments of the present invention, all other embodiments derived by a person of ordinary skill in the art without creative efforts shall fall within the protection scope of the present invention.

A foaming material provided by the present invention includes the following components in parts by mass: 100 parts of combined polyols, 10-30 parts of a foaming agent composition, and 120-150 parts of isocyanate.

The combined polyols include the following components in parts by mass: 10 parts of polyether polyol A prepared by enabling mannitol as an initiator to react with olefin oxide; 5-15 parts of polyether polyol B prepared by enabling pentaerythritol as an initiator to react with olefin oxide; 5-25 parts of polyether polyol C prepared by enabling sucrose and glycerol as initiators to react with olefin oxide; and 50-75 parts of polyester polyol prepared by synthesizing one of phthalic acid, adipic acid and phthalic anhydride with polyol, wherein polyol is ethylene glycol, propylene glycol or pentaerythritol.

Polyether polyol is of an ether bond structure and thus can easily improve the toughness of a material by its own flipping. However, polyester polyol is dominated by an ester bond, and the ester bond is a rigid group that is hard to flip. Therefore, in the present invention, the types of polyols used in the foaming system are adjusted, the content of the polyester polyol is increased, and the content of the polyether polyols is reduced, such that the compression strength is significantly improved without increasing or changing the material injection amount.

Moreover, the combined polyols have a viscosity of 1,500 mpa·s to 3,000 mpa·s and a hydroxyl value of 350 mg KOH/g to 500 mg KOH/g at the room temperature.

The foaming agent composition includes at least one of cyclopentane, isopentane, pentafluoropropene, 1-chloro-3,3,3-trifluoropropene and (Z)-1,1,1,4,4,4-hexafluoro-2-butene (LBA\FEA1100); and/or isocyanate has a viscosity of 150 mpa·s to 250 mpa·s at the room temperature and contains 30.5% to 32% of an —NCO group.

Referring to the table below for the composition of the foaming material and the performance generation of polyurethane foamed plastic formed by injecting the foaming material into a mould cavity for foaming and curing in a plurality of embodiments. By comparing Embodiments 1 to 6 and Comparative Example 1, it can be seen that the compression strength of the polyurethane foamed plastic gradually increases with the increase in the content of the polyester polyol and the decrease in the content of the polyether polyols. In addition, when the content of the polyester polyol is not less than half of the content of the entire polyol composition, the compression strength of 150 KPa or more can be achieved.

|   | Embodiment 1 | Embodiment 2 | Embodiment 3 | Embodiment 4 | Embodiment 5 | Embodiment 6 | Comparative Example1 |
|---|---|---|---|---|---|---|---|
| Polyether polyol A | 40 | 30 | 15 | 10 | 10 | 10 | 30 |
| Polyether polyol B | 30 | 30 | 30 | 15 | 5 | 10 | 30 |
| Polyether polyol C | 25 | 25 | 25 | 25 | 10 | 5 | 40 |
| Polyester polyol D | 5 | 15 | 30 | 50 | 75 | 75 | 0 |

-continued

|  | Embodiment 1 | Embodiment 2 | Embodiment 3 | Embodiment 4 | Embodiment 5 | Embodiment 6 | Comparative Example1 |
|---|---|---|---|---|---|---|---|
| Foaming agent Cyclopentane | 15 | 15 | 15 | 15 | 15 | 15 | 15 |
| Compatibility between polyol composition and foaming agent | Compatible | Compatible | Compatible | Compatible | Compatible | Compatible | Compatible |
| Isocyanate | 140 | 140 | 140 | 140 | 140 | 140 | 140 |
| Compression strength (Kpa) | 132 | 145 | 148 | 156 | 165 | 163 | 125 |
| Mean density (Kg/m$^3$) | 36.2 | 36.4 | 36.1 | 36 | 35.8 | 36.5 | 37 |
| Coefficient of heat conductivity (mw/m · k) | 18.4 | 18.6 | 18.7 | 18.7 | 18.9 | 18.9 | 18.3 |
| Low-temperature (−30° C.) stability (%) | 0.46 | 0.43 | 0.41 | 0.39 | 0.36 | 0.37 | 0.50 |
| Porosity by closed pore (%) | >90 | >90 | >90 | >90 | >90 | >90 | >92 |
| Aperture size (μm) | 150-200 | 160-220 | 160-190 | 160-210 | 160-250 | 160-230 | 135-190 |

The present invention further provides a method for preparing a thermal insulation cabinet, including: pre-assembling a shell into a cabinet shell; and injecting the foaming material described above between the cabinet shell and an inner liner for foaming, wherein the foaming process includes: acquiring a first mixture by mixing combined polyols at a predetermined ratio; acquiring a foaming agent mixture by pre-mixing foaming agents at a predetermined ratio; acquiring a second mixture by mixing the foaming agent mixture with the first mixture at a predetermined ratio; and mixing isocyanate with the second mixture at a predetermined ratio to form a new mixture, and injecting the new mixture between the cabinet shell and the inner liner for foaming.

Specifically, stirring all ingredients of combined polyols at a temperature of 20° C. to 25° C. for 2-3 hours; and/or stirring the foaming agent mixture and the first mixture at a temperature of 20° C. to 25° C. and a pressure of 2-3 bars for 2-3 hours; and/or mixing isocyanate with the second mixture at a temperature of 20° C. to 25° C. and a pressure of 120-30 bars.

Further, the method for preparing a thermal insulation cabinet according to the present invention further includes: attaching a vacuum insulation panel to the inner side of the shell; and heating the inside of the cabinet shell before foaming. By heating the inside of the cabinet shell, the inner surface of the shell, especially the side of the vacuum insulation panel facing the inner liner, can reach a target temperature required for foaming so as to reduce or avoid skinning of the foaming material on the surface of the vacuum insulation panel and to further improve the thermal insulation effect of the thermal insulation cabinet.

Specifically, the vacuum insulation panel adopts a conventional structure, and the attachment position and the attachment method of the vacuum insulation panel on the shell belongs to the prior art, which thus will not be repeated herein.

In the present invention, the inside of the cabinet shell is heated by blowing hot air to the inside at a foaming material injection hole of the cabinet shell, directly using the foaming material injection hole without forming a new inlet. Besides, workers on a foaming process line are familiar with the position, shape, size and the like of the foaming material injection hole, which is convenient for operation and control.

In a specific embodiment, hot air is blown to the inside at the foaming material injection hole by a hot air gun, and the hot air gun is directly aimed at the foaming material injection hole so that all of the hot air enters the inside of the cabinet shell, thereby saving energy.

Further, the temperature of the hot air used for heating ranges from 50° C. to 7° C.; and/or the hot air is blown for 5 seconds to 10 seconds, so as to ensure that the inner side of the shell to which the vacuum insulation panel is attached can reach the temperature required for foaming.

In addition, the inside of the cabinet shell can be heated at any time before the foaming material is injected. Specifically, the inside of the cabinet shell is heated before or after the cabinet shell enters a foaming mould.

Further, the method for preparing a thermal insulation cabinet further includes: preheating the cabinet shell before heating the inside of the cabinet shell. The preheating process belongs to the prior art. Heating the cabinet shell to the required temperature in advance can shorten the time for heating the inside of the cabinet shell, and ensure that the overall temperature of the cabinet shell meets the foaming requirements.

One specific process flow is described as below: after conventional preheating of the cabinet shell, the cabinet shell is put into the foaming mould, and then the inside of the cabinet shell is heated. Alternatively, after conventional preheating of the cabinet shell, the inside of the cabinet shell is heated, and then the cabinet shell is put into the foaming mould for foaming. Both of these two processes can reduce or avoid skinning.

The present invention further provides a thermal insulation cabinet prepared by adopting any of the methods for preparing a thermal insulation cabinet, and the thermal insulation cabinet is applicable to home appliances such as a wine cabinet, a refrigerator and a freezer.

In summary, according to the present invention, the types of the polyols used in the foaming system are adjusted, the content of the polyester polyol is increased, and the content of the polyether polyols is reduced, such that the compression strength is significantly improved without increasing or changing the material injection amount.

It should be understood that although the description is described based on the embodiments, not every embodiment includes only one independent technical solution. This statement of the description is only for clarity. Those skilled in the art should treat the description as a whole, and technical solutions in all of the embodiments may also be properly combined to form other embodiments that will be understood by those skilled in the art.

The above detailed description only aims to specifically illustrate the available embodiments of the present invention, and is not intended to limit the protection scope of the present invention. Equivalent embodiments or modifications made without departing from the spirit of the present invention shall fall within the protection scope of the present invention.

What is claimed is:

1. A foaming material, comprising (in parts by mass):
100 parts of combined polyols;
10-30 parts of a foaming agent composition; and
120-150 parts of isocyanate;
wherein the combined polyols comprise:
10 parts of polyether polyol A prepared by enabling mannitol as an initiator to react with olefin oxide;
5-15 parts of polyether polyol B prepared by enabling pentaerythritol as an initiator to react with olefin oxide;
5-25 parts of polyether polyol C prepared by enabling sucrose and glycerol as initiators to react with olefin oxide; and
50-75 parts of polyester polyol prepared by synthesizing one of phthalic acid, adipic acid and phthalic anhydride with polyol, wherein polyol is ethylene glycol, propylene glycol or pentaerythritol.

2. The foaming material according to claim 1, wherein the combined polyols have a viscosity of 1,500 mpa·s to 3,000 mpa·s and a hydroxyl value of 350 mg KOH/g to 500 mg KOH/g at a room temperature; and/or
the blowing agent composition comprises at least one of cyclopentane, isopentane, pentafluoropropene, 1-chloro-3,3,3-trifluoropropene and (Z)-1,1,1,4,4,4-hexafluoro-2-butene (LBA\FEA1100); and/or
isocyanate has a viscosity of 150 mpa·s to 250 mpa·s at the room temperature and contains 30.5% to 32% of an —NCO group.

3. A method for preparing a thermal insulation cabinet, comprising:
pre-assembling a shell into a cabinet shell; and
injecting the foaming material as defined in claim 1 between the cabinet shell and an inner liner for foaming;
wherein a foaming process comprises:
acquiring a first mixture by mixing combined polyols at a predetermined ratio;
acquiring a foaming agent mixture by pre-mixing foaming agents at a predetermined ratio;
acquiring a second mixture by mixing the foaming agent mixture with the first mixture at a predetermined ratio; and
mixing isocyanate with the second mixture at a predetermined ratio to form a new mixture, and injecting the new mixture between the cabinet shell and the inner liner for foaming.

4. The method according to claim 3, wherein:
stirring the combined polyols at a temperature of 20° C. to 25° C. for 2-3 hours; and/or
stirring the foaming agent mixture and the first mixture at a temperature of 20° C. to 25° C. and a pressure of 2-3 bars for 2-3 hours; and/or
mixing isocyanate with the second mixture at a temperature of 20° C. to 25° C. and a pressure of 120-30 bars.

5. The method according to claim 3, further comprising:
attaching a vacuum insulation panel to an inner side of the shell; and
heating an inside of the cabinet shell before foaming.

6. The method according to claim 5, wherein the inside of the cabinet shell is heated by blowing hot air to the inside at a foaming material injection hole of the cabinet shell.

7. The method according to claim 6, wherein the hot air is blown to the inside at the foaming material injection hole by a hot air gun.

8. The method according to claim 6, wherein:
a temperature of the hot air ranges from 50° C. to 70° C.; and/or
the hot air is blown for 5 seconds to 10 seconds.

9. The method according to claim 5, wherein the inside of the cabinet shell is heated before or after the cabinet shell enters a foaming mould.

10. The method according to claim 5, further comprising:
preheating the cabinet shell before heating the inside of the cabinet shell; or
preheating the cabinet shell, putting the preheated cabinet shell into a foaming mould, and heating the inside of the cabinet shell.

11. A thermal insulation cabinet prepared by a method for preparing a thermal insulation cabinet, wherein the method for preparing a thermal insulation cabinet comprises:
pre-assembling a shell into a cabinet shell; and
injecting the foaming material as defined in claim 1 between the cabinet shell and an inner liner for foaming;
wherein a foaming process comprises:
acquiring a first mixture by mixing combined polyols at a predetermined ratio;
acquiring a foaming agent mixture by pre-mixing foaming agents at a predetermined ratio;
acquiring a second mixture by mixing the foaming agent mixture with the first mixture at a predetermined ratio; and
mixing isocyanate with the second mixture at a predetermined ratio to form a new mixture, and injecting the new mixture between the cabinet shell and the inner liner for foaming.

12. The thermal insulation cabinet according to claim 11, wherein:
the combined polyols are stirred for 2-3 hours at a temperature of 20° C. to 25° C.; and/or
the foaming agent mixture and the first mixture are stirred at a temperature of 20° C. to 25° C. and a pressure of 2-3 bars for 2-3 hours; and/or
isocyanate is mixed with the second mixture at a temperature of 20° C. to 25° C. and a pressure of 120-30 bars.

13. The thermal insulation cabinet according to claim 11, wherein the method for preparing the thermal insulation cabinet further comprises:
attaching a vacuum insulation panel to an inner side of the shell; and
heating an inside of the cabinet shell before foaming.

14. The thermal insulation cabinet according to claim 13, wherein the hot air is blown to the inside at the foaming material injection hole by a hot air gun; a temperature of the hot air ranges from 50° C. to 70° C.; and/or the hot air is blown for 5 seconds to 10 seconds.

15. The thermal insulation cabinet according to claim 13, wherein the method for preparing the thermal insulation cabinet further comprises: preheating the cabinet shell before heating the inside of the cabinet shell; or
preheating the cabinet shell, putting the preheated cabinet shell into a foaming mould, and heating the inside of the cabinet shell.

* * * * *